(12) United States Patent
Uwabo et al.

(10) Patent No.: US 12,311,937 B2
(45) Date of Patent: May 27, 2025

(54) VEHICLE CONTROL METHOD AND VEHICLE CONTROL DEVICE

(71) Applicant: Nissan Motor Co., Ltd., Yokohama (JP)

(72) Inventors: Kazuyuki Uwabo, Kanagawa (JP); Yasuhisa Taira, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/708,069

(22) PCT Filed: Nov. 10, 2021

(86) PCT No.: PCT/JP2021/041421
§ 371 (c)(1),
(2) Date: May 7, 2024

(87) PCT Pub. No.: WO2023/084657
PCT Pub. Date: May 19, 2023

(65) Prior Publication Data
US 2025/0108802 A1     Apr. 3, 2025

(51) Int. Cl.
*B60W 30/14*     (2006.01)
*B60W 50/14*     (2020.01)

(52) U.S. Cl.
CPC .......... *B60W 30/143* (2013.01); *B60W 50/14* (2013.01); *B60W 2420/403* (2013.01)

(58) Field of Classification Search
CPC .............. B60W 30/143; B60W 50/14; B60W 2420/403; B60W 2554/801; B60W 30/12; G06V 20/588; G06T 2207/30256
See application file for complete search history.

(56) References Cited

U.S. PATENT DOCUMENTS 11,661,090 B2     5/2023 Kondo et al.
2017/0072955 A1*  3/2017 Ediger ................ B60W 30/143
(Continued)

FOREIGN PATENT DOCUMENTS

JP     2016-200472 A     12/2016
JP     2017-156954 A     9/2017
(Continued)

*Primary Examiner* — Kenneth J Malkowski
(74) *Attorney, Agent, or Firm* — Young Basile Hanlon & MacFarlane, P.C.

(57) ABSTRACT

A controller: determines whether a current position of an own vehicle is within a high-definition map-available region in which high-definition map information is available; when the current position is within the map-available region, performs acceleration/deceleration of the own vehicle, based on specified speed information acquired by recognizing a speed sign in a captured image or acquired from the high-definition map information and also notifying a driver of the specified speed information; and when the own vehicle is predicted to leave the high-definition map-available region, terminates the acceleration/deceleration control based on the specified speed information and also acquires specified speed information from road map information, the road map information having lower precision than the high-definition map information, based on the current position of the own vehicle and notifies the driver of the acquired specified speed information before a point at which the own vehicle leaves the map-available region.

6 Claims, 5 Drawing Sheets

(56) References Cited

U.S. PATENT DOCUMENTS

| | | | |
|---|---|---|---|
| 2017/0144664 A1* | 5/2017 | Yamashita | B60W 30/143 |
| 2021/0223058 A1 | 7/2021 | Horihata et al. | |
| 2021/0229708 A1 | 7/2021 | Kondo et al. | |
| 2021/0276550 A1* | 9/2021 | Gotou | G08G 1/16 |
| 2023/0021313 A1* | 1/2023 | Cristea | G01C 21/3889 |

FOREIGN PATENT DOCUMENTS

| | | |
|---|---|---|
| JP | 2018-185739 A | 11/2018 |
| JP | 2019-212188 A | 12/2019 |
| JP | 2020-097399 A | 6/2020 |
| JP | 2021-115983 A | 8/2021 |

\* cited by examiner

VEHICLE CONTROL METHOD AND VEHICLE CONTROL DEVICE

TECHNICAL FIELD

The present invention relates to a vehicle control method and a vehicle control device.

BACKGROUND

A road sign recognition device described in JP 2019-212188 A described below sets "high" as a degree of reliability of map information when a road sign is recognized from an image captured by an image capturing unit and the recognized road sign coincides with a road sign in the map information, retains the degree of reliability until a degree of reliability is determined next time, and when the degree of reliability is "high", determines that the road sign in the map information is a road sign corresponding to the current position.

SUMMARY

Recent years, high-definition map information has been known to be a map suitable for use in autonomous driving. By using information about specified speed (for example, speed limit or recommended speed) stored in such high-definition map information in combination, specified speed information can be acquired even when a state in which no speed sign is recognized from a captured image captured by a camera continues. This capability enables acceleration or deceleration of the own vehicle to be controlled based on more appropriate specified speed information. However, a region in which the high-definition map information is available is limited to a specific region, and in a region in which the high-definition map information is not available, when a state in which no speed sign is recognized from a captured image continuing makes it impossible for specified speed information at the current position of the own vehicle to be acquired, control of acceleration or deceleration of the own vehicle based on appropriate specified speed information becomes unable to be performed.

An object of the present invention is to avoid control of acceleration or deceleration of an own vehicle based on inappropriate specified speed information being performed in a region in which high-definition map information is not available.

According to an aspect of the present invention, there is provided a vehicle control method causing a controller to execute processing including: acquiring a current position of an own vehicle; acquiring a captured image representing an environment in front of the own vehicle from a camera; determining whether or not a current position of the own vehicle is within a high-definition map-available region in which high-definition map information is available; when determining that a current position of the own vehicle is within the high-definition map-available region, performing acceleration/deceleration control to control acceleration or deceleration of the own vehicle, based on specified speed information acquired by recognizing a speed sign in the captured image or specified speed information acquired from the high-definition map information based on a current position of the own vehicle and also notifying a driver of the specified speed information; and when the own vehicle is predicted to leave the high-definition map-available region to an outside, terminating the acceleration/deceleration control based on the specified speed information and also acquiring the specified speed information from road map information, the road map information having lower precision than the high-definition map information, based on a current position of the own vehicle and notifying the driver of the acquired specified speed information, at a point before a point at which the own vehicle leaves the high-definition map-available region to an outside.

According to an aspect of the present invention, it is possible to avoid control of acceleration or deceleration of an own vehicle based on inappropriate specified speed information being performed in a region in which high-definition map information is not available.

The object and advantages of the invention will be realized and attained by means of the elements and combinations particularly pointed out in the claims. It is to be understood that both the foregoing general description and the following detailed description are exemplary and explanatory and are not restrictive of the invention.

DETAILED DESCRIPTION (Configuration)

Figure 1:
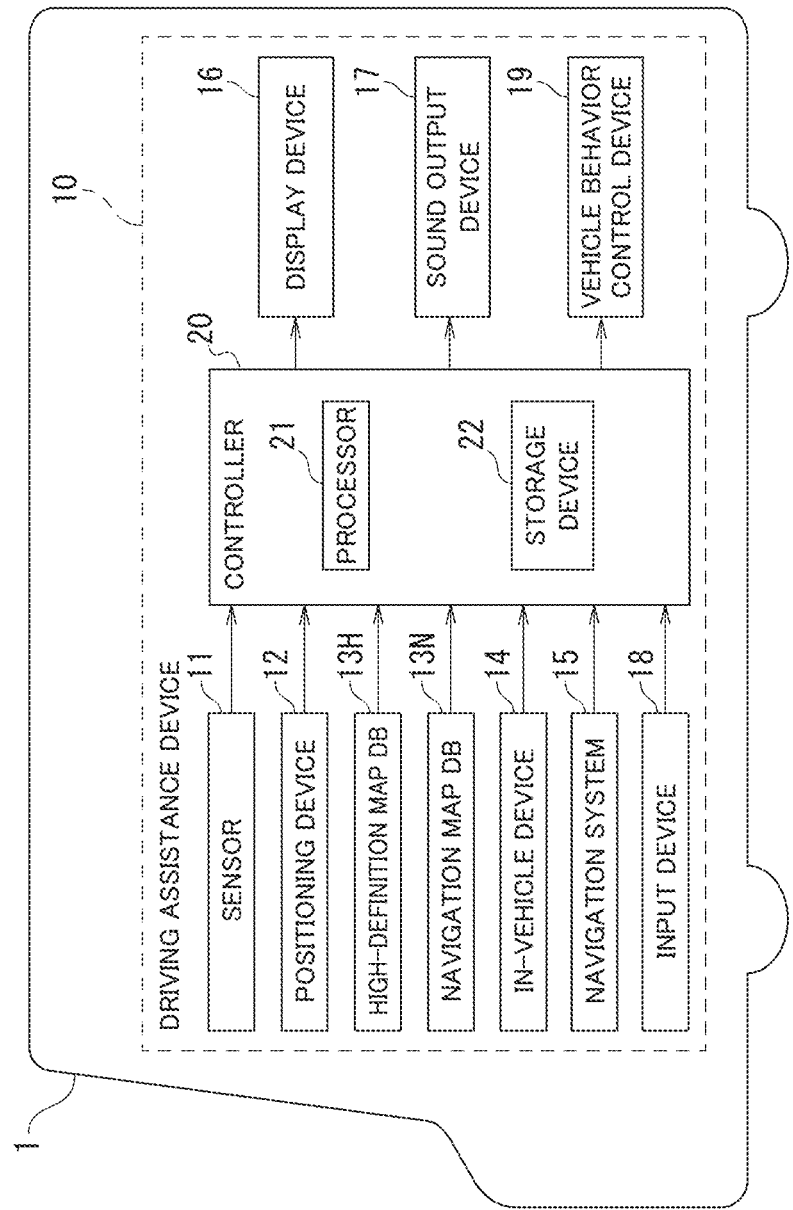
FIG. 1 is a diagram illustrative of an example of a schematic configuration of a vehicle on which a driving assistance device of an embodiment is mounted.

FIG. 1 is a diagram illustrative of an example of a schematic configuration of a vehicle on which a driving assistance device of an embodiment is mounted. A driving assistance device 10 mounted on an own vehicle 1 includes a sensor 11, a positioning device 12, a high-definition map database (high-definition map DB) 13H, a navigation map database (navigation map DB) 13N, an in-vehicle device 14, a navigation system 15, a display device 16, a sound output device 17, an input device 18, a vehicle behavior control device 19, and a controller 20. The above-described devices are connected to one another via, for example, a controller area network (CAN) or another in-vehicle LAN in order to perform transmission and reception of information with one another. Note that the driving assistance device 10 is an example of a "vehicle control device" described in the claims.

The sensor 11 detects a travel state of the own vehicle 1. For example, the sensor 11 includes cameras, such as a front view camera for capturing a front view of the own vehicle 1, a rear view camera for capturing a rear view of the own vehicle 1, and side view cameras for capturing right and left side views of the own vehicle 1. In addition, the sensor 11 includes radars, such as a front view radar for detecting an obstacle in front of the own vehicle 1, a rear view radar for detecting an obstacle in the rear of the own vehicle 1, and side view radars for detecting an obstacle existing on the right and left lateral sides of the own vehicle 1. Further, the sensor 11 includes a vehicle speed sensor for detecting vehicle speed of the own vehicle 1, a touch sensor (capacitance sensor) for detecting holding of a steering wheel by a passenger (for example, a driver), an in-vehicle camera for capturing the passenger, and the like.

The positioning device 12 includes a GPS unit, a gyro sensor, a vehicle speed sensor, and the like. The positioning device 12 detects radio waves transmitted from a plurality of communication satellites by the GPS unit and periodically acquires position information of the own vehicle 1. In addition, the positioning device 12 detects a current position of the own vehicle 1, based on acquired position information of the own vehicle 1, angle change information acquired from the gyro sensor, and vehicle speed acquired from the vehicle speed sensor.

The high-definition map DB 13H is a memory that stores three-dimensional high-definition map information including position information of various types of facilities and specific points and that is configured to be accessible from the controller 20. The three-dimensional high-definition map information is three-dimensional map information based on road shapes detected when a vehicle for data acquisition traveled on actual roads. The three-dimensional high-definition map information is map information in which detailed and highly precise position information of a curved road and the amount of curvature (for example, curvature or radius of curvature) of the road, a junction of roads, a branch point, a tollgate, a point of reduction in the number of lanes, and the like is associated with map information as three-dimensional information.

The three-dimensional high-definition map information enables a self-position of the own vehicle 1 on the map to be estimated with high precision since the three-dimensional high-definition map information includes high-definition shape information and high-precision position information. In addition, the three-dimensional high-definition map information includes specified speed information that indicates specified speed (speed limit, such as maximum speed and minimum speed, and recommended speed) specified with respect to each lane. The specified speed information may be information that is associated with, for example, a road or a lane and that specifies specified speed of an associated road or lane, or may be information about an installation position of a speed sign and specified speed indicated by the speed sign.

The navigation map DB 13N is a memory that stores navigation map information to be used by the navigation system 15, which will be described later, and that is configured to be accessible from the navigation system 15 and the controller 20. The navigation map information is map information having lower precision than the three-dimensional high-definition map information and is an example of "road map information" described in the claims.

The navigation map information includes information in units of roads. For example, the navigation map information includes, as information in units of roads, information about road nodes that indicate reference points on a road reference line and information about road links that indicate forms of road sections between road nodes. Information about each road node includes a position coordinates, the number of connected road links, and identification numbers of connected road links. Information about each road link includes road standard, link length, the number of lanes, road width, and specified speed information.

The navigation map information has lower definition of shape information and lower precision of position information than the three-dimensional high-definition map information. Thus, estimation precision of the self-position of the own vehicle 1 on the map is lower than the three-dimensional high-definition map information. In addition, accuracy of the specified speed information in the navigation map information is sometimes lower than the high-definition map information. For example, since the specified speed information in the navigation map information is stored on a road-by-road basis, the specified speed information in the navigation map information is sometimes different from specified speed information of a lane in which the own vehicle 1 is traveling when different specified speed information is specified for each lane.

The in-vehicle device 14 is various types of devices mounted on the own vehicle 1 and operates in accordance with an operation by the passenger. Examples of such an in-vehicle device include a steering wheel, an accelerator pedal, a brake pedal, turn signals, windshield wipers, lights, a horn, other specific switches, and the like.

The navigation system 15 acquires current position information of the own vehicle 1 from the positioning device 12 and, by superimposing the position of the own vehicle 1 on the navigation map information, displays the current position on a display or the like. In addition, the navigation system 15 includes a navigation function to, when a destination is set, set a route to the destination on the map of the navigation map information and guide the passenger along the set route. A route set by the navigation system 15 is sometimes referred to as a "scheduled travel route".

The navigation function displays a scheduled travel route on a map on the display and informs the passenger of the scheduled travel route by voice or the like. The scheduled travel route is also used in a route travel assistance function that the controller 20 includes. The route travel assistance function is a function to cause the own vehicle 1 to autonomously travel to a destination, based on a scheduled travel route.

The display device 16 includes various types of displays, such as a display that the navigation system 15 includes, a display incorporated in a rearview minor, a display incorporated in a meter section, and a head-up display projected on a windshield. The display device 16 notifies the passenger of various types of presented information in accordance with control by the controller 20.

The sound output device 17 is a device to output acoustic information, such as a speaker that the navigation system 15 includes, a speaker of an audio device, and a buzzer. The sound output device 17 notifies the passenger of various types of presented information in accordance with control by the controller 20.

The input device 18 is a device, such as a button switch that enables the passenger to input an operation by manual operation, a touch panel arranged on a display screen, and a microphone that enables the passenger to input an operation by voice. The passenger, by operating the input device 18, is able to input setting information in response to presented information presented by the display device 16 and the sound output device 17.

Figure 2:
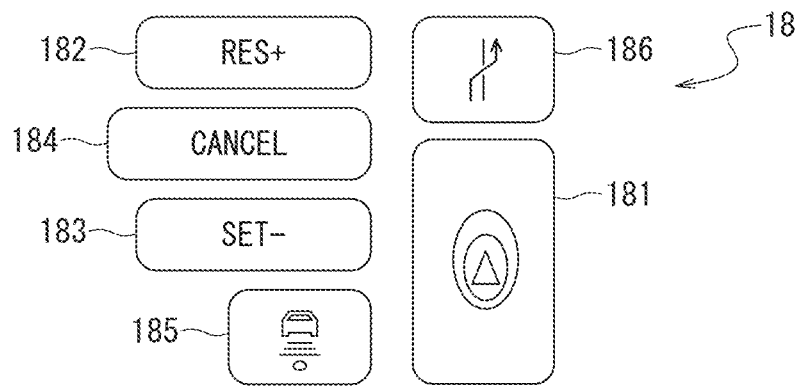
FIG. 2 is a diagram illustrative of a portion of an input device in FIG. 1.

FIG. 2 is a diagram illustrative of a portion of the input device 18 of the present embodiment. The input device 18 may be a button switch group that is arranged on, for example, a spoke of the steering wheel. The input device 18 is used when turning on and off and the like of an autonomous travel control function that the controller 20 includes are set. The input device 18 includes a main switch 181, a resume/accelerate switch 182, a set/coast switch 183, a cancel switch 184, an inter-vehicle distance adjustment switch 185, and a lane change assistance switch 186.

The main switch 181 is a switch to turn on and off the autonomous travel control function of the controller 20. The resume/accelerate switch 182 is a switch to, after turning off the autonomous travel control function, set resumption of the autonomous travel control function at a set speed before the turning-off of the autonomous travel control function or to increase the set speed. The set/coast switch 183 is a switch to start the autonomous travel control function. In order to start the autonomous travel control function, for example, after the autonomous travel control function is turned on by the main switch 181, the set/coast switch 183 is pressed. The set/coast switch 183 is also a switch to decrease the set speed. The cancel switch 184 is a switch to cancel the autonomous travel control function. The inter-vehicle distance adjustment switch 185 is a switch to set an inter-vehicle distance to a preceding vehicle. The lane change assistance switch 186 is a switch to, when the controller 20 confirms start of a lane change to the passenger, instruct (accept) the start of the lane change.

Note that, in addition to the button switch group illustrated in FIG. 2, a turn signal lever for the turn signals and another switch in the in-vehicle device 14 can be used as the input device 18. For example, when the passenger operates the turn signal lever in the case where whether or not a lane change is performed in an automated manner is proposed by the controller 20, a lane change in a direction in which the turn signal lever is operated is performed instead of the proposed lane change.

The vehicle behavior control device 19 controls vehicle behavior of the own vehicle 1. For example, when the own vehicle 1 performs constant speed travel at a set speed by the autonomous travel control function, the vehicle behavior control device 19 controls operation of a drive mechanism and brake operation to achieve acceleration/deceleration and travel speed that enable the own vehicle 1 to travel at the set speed. In addition, when the own vehicle 1 travels following a preceding vehicle by the autonomous travel control function, the vehicle behavior control device 19 also likewise controls the operation of the drive mechanism and the brake. Note that the operation control of the drive mechanism includes operation of an internal-combustion engine in the case of an engine-driven vehicle and operation of a motor for traveling in the case of an electric vehicle. In addition, the operation control of the drive mechanism includes torque distribution between an internal-combustion engine and a motor for traveling in the case of a hybrid vehicle.

In addition, when the vehicle behavior control device 19 performs lane-keeping control, a lane change assistance function, a passing assistance function, or a route travel assistance function, which will be described later, by the autonomous travel control function, the vehicle behavior control device 19 performs, in addition to the operation control of the drive mechanism and the brake, steering control of the own vehicle 1 by controlling operation of a steering actuator.

The controller 20 is one or a plurality of electronic control units for controlling travel of the own vehicle 1 and includes a processor 21 and peripheral components, such as a storage device 22. The processor 21 may be, for example, a central processing unit (CPU) or a micro-processing unit (MPU). The storage device 22 may include a semiconductor storage device, a magnetic storage device, an optical storage device, and the like. The storage device 22 may include registers, a cache memory, and a memory, such as a read only memory (ROM) or a random access memory (RAM), that is used as a main storage device.

Functions of the controller 20, which will be described below, are achieved by, for example, the processor 21 executing computer programs stored in the storage device 22.

Note that the controller 20 may be formed using dedicated hardware for performing various types of information processing that will be described below. For example, the controller 20 may include a functional logic circuit that is implemented in a general-purpose semiconductor integrated circuit. For example, the controller 20 may include a programmable logic device (PLD), such as a field-programmable gate array (FPGA), and the like.

The controller 20 achieves a travel information acquisition function to acquire information relating to a travel state of the own vehicle 1 and an autonomous travel control function to autonomously control travel speed and/or steering of the own vehicle 1. The travel information acquisition function of the controller 20 is a function to acquire travel information relating to a travel state of the own vehicle 1. For example, the controller 20 may acquire, as the travel information, image information of the outside of the vehicle captured by the front view camera, the rear view camera, and the side view cameras in the sensor 11. In addition, the controller 20 acquires, as the travel information, detection results by the front view radar, the rear view radar, and the side view radars. Further, the controller 20 also acquires, as the travel information, vehicle speed information of the own vehicle 1 detected by the vehicle speed sensor in the sensor 11 and image information of the face of the passenger captured by the in-vehicle camera.

Further, the controller 20 acquires, as the travel information, the current position information of the own vehicle 1 from the positioning device 12. In addition, the controller 20 acquires, as the travel information, a set destination and a scheduled travel route to the destination from the navigation system 15. Further, the controller 20 acquires, as the travel information, position information of a curved road and the amount of curvature (for example, curvature or radius of curvature) of the road, a junction of roads, a branch point, a tollgate, a point of reduction in the number of lanes, and the like from the high-definition map DB 13H or the navigation map DB 13N. Moreover, the controller 20 acquires, as the travel information, information about operation of the in-vehicle device 14 by the passenger from the in-vehicle device 14.

The autonomous travel control function of the controller 20 is a function to autonomously control travel of the own vehicle 1 without depending on operation by the passenger. The autonomous travel control function of the controller 20 includes an autonomous speed control function to autonomously control travel speed of the own vehicle 1 by controlling acceleration or deceleration of the own vehicle 1 and an autonomous steering control function to autonomously control steering of the own vehicle 1. The above-described autonomous control is performed based on the high-definition map information in the high-definition map DB 13H. The autonomous control of travel speed (hereinafter, referred to as "autonomous speed control") by the autonomous speed control function is an example of "acceleration/deceleration control" described in the claims.

The autonomous speed control function and the autonomous steering control function of the present embodiment will be described below. Note that, in the present invention, the autonomous travel control function is only necessary to include only the autonomous speed control function, and the autonomous travel control function does not necessarily have to include the autonomous steering control function.

<Autonomous Speed Control Function>

The autonomous speed control function is a function to, when the own vehicle 1 is positioned in a high-definition map-available region Ray that is a region in which the high-definition map information is available, control the own vehicle 1 to travel following a preceding vehicle while performing inter-vehicle distance control in such a way as to keep an inter-vehicle distance matching vehicle speed with a speed limit of a lane in which the own vehicle 1 is traveling or a vehicle speed set by the passenger used as an upper limit.

When no preceding vehicle is detected, the autonomous speed control function controls the own vehicle 1 to perform constant speed travel at the speed limit of the lane in which the own vehicle 1 is traveling or the vehicle speed set by the passenger. The former and the latter are also referred to as inter-vehicle distance control and constant speed control, respectively. Note that when a recommended speed of the lane in which the own vehicle 1 is traveling is set, the own vehicle 1 may perform constant speed travel at the recommended speed. The upper limit speed that is set when a preceding vehicle is detected or a target vehicle speed for the constant speed travel that is set when no preceding vehicle is detected, as described above is sometimes referred to as "set vehicle speed".

Figure 3A:
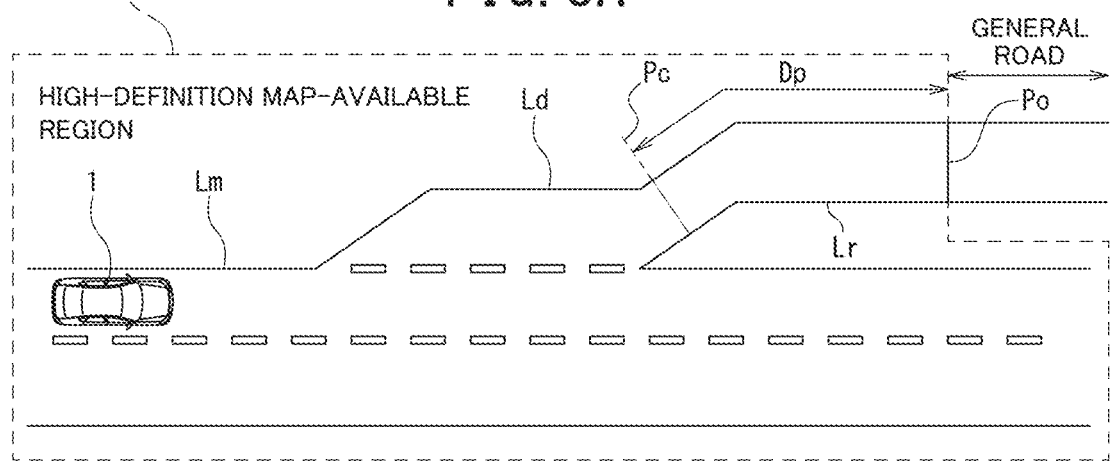
FIG. 3A is a schematic diagram descriptive of a high-definition map-available region.
Figure 3B:
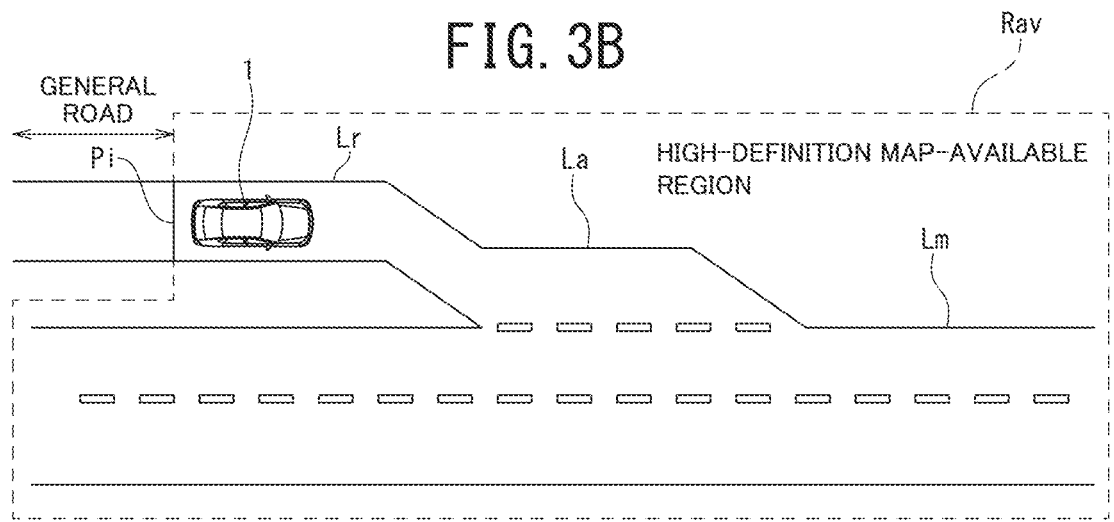
FIG. 3B is a schematic diagram descriptive of another high-definition map-available region.

FIGS. 3A and 3B are schematic diagrams descriptive of high-definition map-available regions Rav. An example of the high-definition map-available region Rav is an automobile dedicated road, such as an expressway (motorway). For example, the high-definition map-available region Ray may include not only a main lane Lm of an automobile dedicated road but also a deceleration lane Ld leading from the main lane Lm to an outlet Po of an interchange between the automobile dedicated road and a general road and a rampway Lr between the deceleration lane Ld and the outlet Po. In addition, for example, the high-definition map-available region Ray may include a rampway Lr leading from an inlet Pi of an interchange to a main lane Lm and an acceleration lane La between the rampway Lr and the main lane Lm.

Although an example of an automobile dedicated road as illustrated in FIGS. 3A and 3B will be described below as the high-definition map-available region Ray, the high-definition map-available region Rav is not limited to an automobile dedicated road and is only required to be a region in which the high-definition map information is available.

When the set/coast switch 183 is pressed after the autonomous travel control function is turned on by the main switch 181, the controller 20 determines whether or not the current position of the own vehicle 1, which is measured by the positioning device 12, is within the high-definition map-available region Rav.

When the current position of the own vehicle 1 is within the high-definition map-available region Ray, the controller 20 performs the autonomous speed control. When the current position of the own vehicle 1 is not within the high-definition map-available region Ray, the controller 20 does not perform the autonomous speed control. The controller 20 may start the autonomous speed control at a point in time at which the current position of the own vehicle 1 changes from the outside to the inside of the high-definition map-available region Rav.

In the autonomous speed control, the controller 20 acquires specified speed information indicating a specified speed (for example, speed limit or recommended speed) specified for a lane in which the own vehicle 1 is traveling by recognizing a speed sign from a captured image captured by a camera in the sensor 11 or acquires specified speed information from the high-definition map information in the high-definition map DB 13H, and sets a set vehicle speed, based on the specified speed. A recognition method of specified speed will be described later.

The constant speed control is performed when it is detected by the front view radar or the like in the sensor 11 that no preceding vehicle exists ahead in an own vehicle lane. In the constant speed control, the vehicle behavior control device 19 controls operation of the drive mechanism, such as the engine and the brake, while feeding back vehicle speed data detected by the vehicle speed sensor in such a manner as to maintain the set vehicle speed.

The inter-vehicle distance control is performed when it is detected by the front view radar or the like in the sensor 11 that a preceding vehicle exists ahead in the own vehicle lane. In the inter-vehicle distance control, the vehicle behavior control device 19 controls operation of the drive mechanism, such as the engine and the brake, while feeding back inter-vehicle distance data detected by the front view radar in such a manner as to limit the vehicle speed to the set vehicle speed or less and also maintain the set inter-vehicle distance.

<Autonomous Steering Control Function>

The autonomous steering control function is a function to perform the steering control of the own vehicle 1 by controlling operation of the steering actuator, based on the high-definition map information. The autonomous steering control function includes, for example, the lane-keeping function, the lane change assistance function, the passing assistance function, and the route travel assistance function.

The lane-keeping function is a function to assist steering of the passenger by controlling the steering actuator in such a way that the own vehicle 1 travels along substantially the center of a lane. For example, when the set/coast switch 183 is pressed after the autonomous travel control function is turned on by the main switch 181, the controller 20 determines whether or not a predetermined autonomous travel control start condition is established. When the controller 20 determines that the autonomous travel control start condition is established, the controller 20 performs the lane-keeping function in the autonomous steering control function.

<Lane Change Assistance Function>

The lane change assistance function turns on a turn signal when the passenger operates the turn signal lever and starts lane change operation that is a series of processing for automated lane change when a predetermined lane change start condition is satisfied. The lane change assistance function determines whether or not the predetermined lane change start condition is established, based on various types of travel information acquired by the travel information acquisition function. The lane change assistance function starts the lane change operation when the lane change start condition is satisfied. The lane change operation causes the own vehicle 1 to laterally move to an adjacent lane and, when the movement to the adjacent lane is completed, turns off the turn signal and starts performance of the lane-keeping function in the adjacent lane.

<Passing Assistance Function>

When a preceding vehicle that is slower than the own vehicle 1 exists ahead in the own vehicle lane and a predetermined passing proposition condition is satisfied, the passing assistance function presents passing information to the passenger by the display device 16. In this configuration, the passing information is information for proposing to pass the preceding vehicle to the passenger. The passing assistance function turns on a turn signal and starts the above-described lane change operation when the passenger accepts the passing by operating the lane change assistance switch 186 in the input device 18 in response to the presentation of the passing information and a preset passing start condition is satisfied. The passing assistance function determines whether or not the passing proposition condition and the passing start condition are established, based on various types of travel information acquired by the travel information acquisition function.

<Route Travel Assistance Function>

When a travel direction change point, such as a branch point, a junction, an exit, and a tollgate, exists in a scheduled travel route, distance to the travel direction change point is within a predetermined distance, and a predetermined route travel proposition condition is satisfied, the route travel assistance function presents route travel information by the display device 16 and proposes a lane change toward the travel direction change point. In addition, the route travel assistance function starts lane change operation when the proposition of lane change is accepted by an operation of the lane change assistance switch 186 and a predetermined route travel start condition is satisfied.

The route travel assistance function determines whether or not the route travel proposition condition and the route travel start condition are established, based on various types of travel information acquired by the travel information acquisition function.

<Recognition Method of Specified Speed>

Next, a recognition method of specified speed by the controller 20 will be described. The controller 20 acquires, as the travel information, information about the current position of the own vehicle 1 measured by the positioning device 12. The controller 20 also acquires a captured image representing an environment in front of the own vehicle 1 from the camera in the sensor 11. The controller 20 determines whether or not the current position of the own vehicle 1 is within the high-definition map-available region Rav. For example, the controller 20 may determine that the current position of the own vehicle 1 is within the high-definition map-available region Ray when high-definition map information at the current position of the own vehicle 1 can be acquired from the high-definition map DB 13H. In addition, the controller 20 may store position information of a region for which high-definition map information is prepared in the high-definition map DB 13H. Whether or not the current position of the own vehicle 1 is within the high-definition map-available region Ray can be determined by various methods.

When the current position of the own vehicle 1 is within the high-definition map-available region Ray, the controller 20 acquires specified speed information specified for a lane in which the own vehicle 1 is traveling by recognizing a speed sign in a captured image captured by the camera in the sensor 11. Alternatively, the controller 20 acquires specified speed information for a lane in which the own vehicle 1 is traveling from the high-definition map information in the high-definition map DB 13H, based on the current position of the own vehicle 1.

For example, when the controller 20 recognizes a speed sign in a captured image captured by the camera, the controller 20 may acquire a speed specified by the speed sign as the specified speed information. When the controller 20 becomes unable to recognize a speed sign in a captured image captured by the camera, the controller 20 may use specified speed information acquired last time from a captured image captured by the camera as the specified speed of the lane in which the own vehicle 1 is traveling until a predetermined time elapses (or until the own vehicle 1 travels a predetermined distance) since the controller 20 becomes unable to recognize a speed sign. When the predetermined time has elapsed (or when the own vehicle 1 has traveled the predetermined distance) since the controller 20 became unable to recognize a speed sign, the controller 20 may acquire specified speed information for the lane in which the own vehicle 1 is traveling from the high-definition map information, based on the current position of the own vehicle 1.

As described above, specified speed information acquired from a captured image captured by the camera or the high-definition map information when the current position of the own vehicle 1 is within the high-definition map-available region Rav is used as a set vehicle speed in the autonomous speed control performed by the controller 20. In addition, the controller 20 notifies the passenger of the acquired specified speed information. For example, the controller 20 may output the specified speed information, using the display device 16 or the sound output device 17.

In contrast, when the current position of the own vehicle 1 is located outside the high-definition map-available region Ray (for example, the own vehicle 1 is traveling a general road), the controller 20 acquires specified speed information of the road on which the own vehicle 1 is traveling from navigation map information in the navigation map DB 13N, based on the current position of the own vehicle 1. Alternatively, the controller 20 acquires specified speed information of the road on which the own vehicle 1 is traveling by recognizing a speed sign in a captured image captured by the camera in the sensor 11. The controller 20 notifies the passenger of the acquired specified speed information. For example, the controller 20 may output the specified speed information, using the display device 16 or the sound output device 17.

When the current position of the own vehicle 1 changes from the inside to the outside of the high-definition map-available region Ray, the controller 20 switches map information from which specified speed information is to be acquired from the high-definition map information in the high-definition map DB 13H to the navigation map information in the navigation map DB 13N and also terminates the autonomous speed control.

On this occasion, when the autonomous speed control is terminated at a point at which the own vehicle 1 leaves the high-definition map-available region Ray (for example, the outlet Po in FIG. 3A) or a point immediately therebefore, there is a risk that inappropriate specified speed information is set as a set speed and the autonomous speed control is performed, based on the set speed.

For example, while the own vehicle 1 is traveling the rampway Lr on the way to the outlet Po, since the camera in the sensor 11 is directed in various directions, the controller sometimes mistakenly recognizes a speed sign on a lane different from the lane in which the own vehicle 1 is traveling. In this case, since as described above, the controller 20 uses specified speed information recognized from a speed sign in a captured image as a specified speed until a predetermined time elapses (or until the own vehicle 1 travels a predetermined distance), there is a risk that the autonomous speed control is performed until the predetermined time elapses (or until the own vehicle 1 travels the predetermined distance), based on incorrect specified speed information.

In addition, even when specified speed information is acquired from the high-definition map information in the high-definition map DB 13H, there is a risk that the same specified speed information as the specified speed information of the main lane Lm is mistakenly stored as specified speed information of the rampway Lr.

Thus, when the own vehicle 1 is predicted to leave the high-definition map-available region Ray to the outside, the controller 20 terminates the autonomous speed control based on the specified speed information at a point before a point at which the own vehicle 1 leaves the high-definition map-available region Ray to the outside. Subsequently, the controller 20 starts processing of acquiring specified speed information from the navigation map information, which has lower precision than the high-definition map information, based on the current position of the own vehicle 1 and notifying the driver of the acquired specified speed information. Hereinafter, a point at which the own vehicle 1 leaves the high-definition map-available region Ray to the outside is sometimes referred to as a "scheduled leaving point".

For example, when a scheduled travel route is set (that is, when a destination is set) in the navigation system 15, the controller 20 may predict that the own vehicle 1 leaves the high-definition map-available region Ray when the scheduled travel route departs from the high-definition map-available region Ray and determine a point at which the scheduled travel route departs from the high-definition map-available region Ray as a scheduled leaving point.

In addition, for example, when no scheduled travel route is set (that is, when no destination is set), the controller 20 may predict that the own vehicle 1 leaves the high-definition map-available region Ray when a travel lane in which the own vehicle 1 is currently traveling departs from the high-definition map-available region Ray ahead of the own vehicle 1 and determine a point at which the travel lane departs from the high-definition map-available region Ray as a scheduled leaving point.

For example, in the example in FIG. 3A, the controller 20 may predict whether or not the own vehicle 1 leaves the high-definition map-available region Ray to the outside by predicting whether or not the own vehicle 1 exits from the outlet Po of the automobile dedicated road and determine the outlet Po as a scheduled leaving point.

For example, when a scheduled travel route is set, the controller 20 may predict that the own vehicle 1 exits from the outlet Po when the scheduled travel route is a route that departs from the outlet Po of the automobile dedicated road. When no scheduled travel route is set, the controller 20 may predict that the own vehicle 1 exits from the outlet Po when the own vehicle 1 is traveling in the deceleration lane Ld leading to the outlet Po or the rampway Lr between the deceleration lane Ld and the outlet Po or performs a lane change to the deceleration lane Ld.

In addition, when even in a region the high-definition map information of which is stored in the high-definition map DB 13H, a use-prohibited region in which use of the high-definition map information is prohibited for the reason of construction work or the like exists, the controller 20 may predict that the own vehicle 1 leaves the high-definition map-available region Ray to the outside when the scheduled travel route or the travel lane of the own vehicle 1 passes the use-prohibited region.

When the controller 20 predicts that the own vehicle 1 leaves the high-definition map-available region Ray to the outside, the controller 20 terminates the autonomous speed control and also starts notifying the driver of specified speed information acquired from the navigation map information at a point Pc before the scheduled leaving point (that is, a point closer to the current position of the own vehicle 1 than the scheduled leaving point). Hereinafter, the point Pc is referred to as a "changeover point Pc". The changeover point Pc may, for example, be a point a predetermined distance Dp before a point at which the own vehicle 1 leaves the high-definition map-available region Ray to the outside (the scheduled leaving point). The predetermined distance Dp may be set to, for example, a distance at which a speed sign can be recognized from a captured image captured by the camera in the sensor 11 (for example, 100 m). In addition, for example, the changeover point Pc may be a point at which time required for the own vehicle 1 to travel to the scheduled leaving point coincides with a predetermined time.

The controller 20 of the present embodiment, when determining whether or not the own vehicle 1 has reached the change point Pc, calculates first remaining distance D1 that is distance that the own vehicle 1 can travel without lane change by the autonomous travel control function based on the high-definition map information. The controller 20 also calculates second remaining distance D2 that is distance between the end of the scheduled travel route on the high-definition map and the current position of the own vehicle 1.

The controller 20 determines that the own vehicle 1 has reached the changeover point Pc when a difference between the first remaining distance D1 and the second remaining distance D2 is less than or equal to a threshold and the first remaining distance D1 or the second remaining distance D2 is less than or equal to the predetermined distance Dp. The controller 20 may determine that the own vehicle 1 has reached the changeover point Pc when both the first remaining distance D1 and the second remaining distance D2 are less than or equal to the predetermined distance Dp.

Figure 4A:
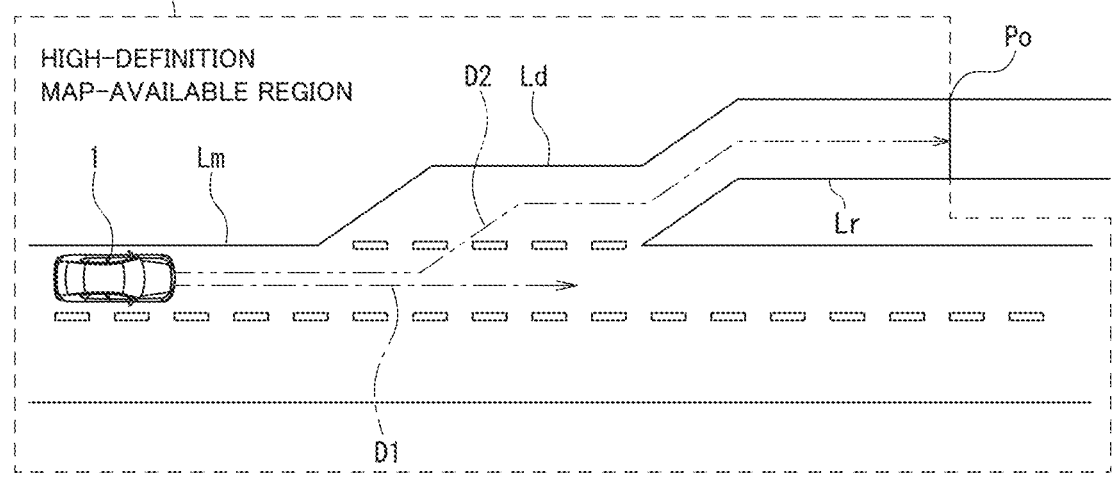
FIG. 4A is a schematic diagram of an example of first remaining distance D1 and second remaining distance D2.
Figure 4B:
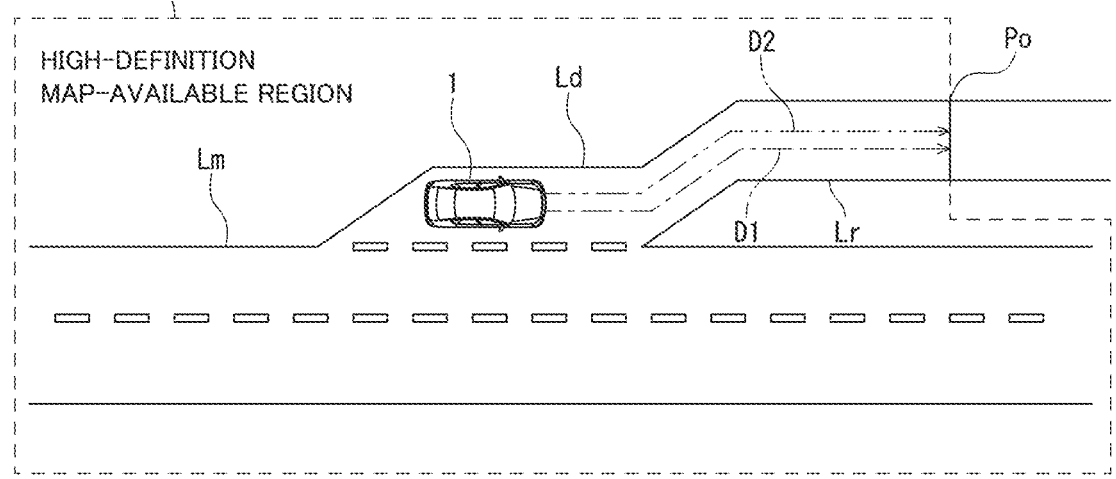
FIG. 4B is a schematic diagram of another example of the first remaining distance D1 and the second remaining distance D2.

FIGS. 4A and 4B are schematic diagrams of examples of the first remaining distance D1 and the second remaining distance D2 when the scheduled travel route is a route that departs from the outlet Po. The dashed-dotted lines indicate routes along which the own vehicle 1 can travel without lane change by the autonomous travel control function based on the high-definition map information. In addition, the dashed-two-dotted lines indicate routes to the ends of scheduled travel routes on the high-definition map, that is, routes from the current position of the own vehicle 1 to the outlet Po.

As illustrated in FIG. 4A, when the own vehicle 1 is traveling in the main lane Lm, the route along which the own vehicle 1 can travel without lane change by the autonomous travel control function based on the high-definition map information is different from the route from the current position of the own vehicle 1 to the outlet Po. Thus, the difference between the first remaining distance D1 and the second remaining distance D2 becomes large.

On the other hand, as illustrated in FIG. 4B, when the own vehicle 1 performs a lane change to the deceleration lane Ld, the end point of the route along which the own vehicle 1 can travel without lane change by the autonomous travel control function based on the high-definition map information is the outlet Po. Thus, the first remaining distance D1 becomes substantially equal to the second remaining distance D2. Therefore, when the difference between the first remaining distance D1 and the second remaining distance D2 is less than or equal to the threshold, the controller 20 is able to accurately predict that the own vehicle 1 is going to exit from the outlet Po.

Determination based on a comparison between the first remaining distance D1 and the second remaining distance D2 as described above enables whether or not the own vehicle 1 has reached the changeover point Pc before the scheduled leaving point (in the example in FIG. 3A, the outlet Po), which is a point at which the own vehicle 1 leaves the high-definition map-available region Rav to the outside, to be accurately determined.

For example, when the own vehicle 1 is determined to have reached the changeover point Pc, based on only whether or not the second remaining distance D2 is less than or equal to the predetermined distance Dp, in the case where the destination of the scheduled travel route is set to a place like a rest area on the automobile dedicated road, the own vehicle 1 being mistakenly determined to have reached the changeover point Pc when the own vehicle 1 enters the rest area causes the autonomous speed control based on the specified speed information to be canceled.

The controller 20 of the present embodiment is configured such that the own vehicle 1 is not determined to have reached the changeover point Pc unless the difference between the first remaining distance D1 and the second remaining distance D2 is less than or equal to a threshold. Since when the destination is set to a rest area as described above, a calculation result of the first remaining distance D1 is different from the second remaining distance D2, it is possible to avoid mistakenly determining that the own vehicle 1 has reached the changeover point Pc.

In contrast, when the current position of the own vehicle 1 changes from the outside to the inside of the high-definition map-available region Rav, the controller 20 terminates notifying the driver of the specified speed information acquired from the navigation map information in the navigation map DB 13N and also switches the map information from which the specified speed information is acquired from the navigation map information to the high-definition map information in the high-definition map DB 13H, at a point in time at which the current position of the own vehicle 1 has changed from the outside to the inside of the high-definition map-available region Rav. Subsequently, the controller 20 starts the autonomous speed control based on the specified speed information and also starts processing of notifying the driver of the specified speed information acquired from a captured image captured by the camera or the high-definition map information.

(Operation)

Figure 5:
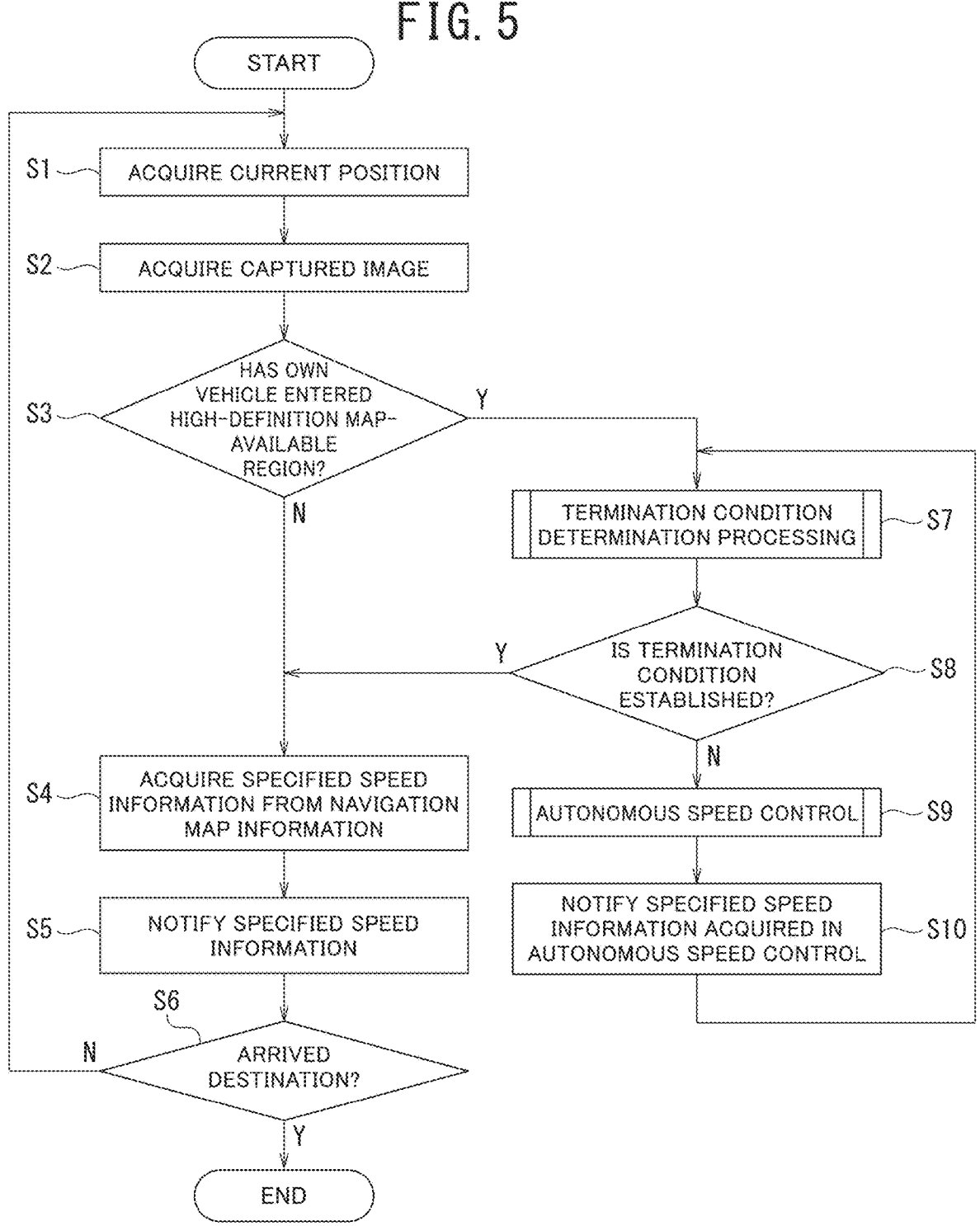
FIG. 5 is a flowchart of an example of a vehicle control method of the embodiment.

FIG. 5 is a flowchart of an example of a vehicle control method of the embodiment.

In step S1, the controller 20 acquires current position information of the own vehicle 1 from the positioning device 12. In step S2, the controller 20 acquires a captured image representing an environment in front of the own vehicle 1 from a camera in the sensor 11.

In step S3, the controller 20 determines whether or not the current position of the own vehicle 1 has changed from the outside to the inside of the high-definition map-available region Rav. When the current position of the own vehicle 1 has changed from the outside to the inside of the high-definition map-available region Rav (step S3: Y), the process proceeds to step S7 When the current position of the own vehicle 1 is outside the high-definition map-available region Rav (step S3: N), the process proceeds to step S4.

In step S4, the controller 20 acquires specified speed information from the navigation map information, based on the current position of the own vehicle 1. In step S5, the controller 20 notifies a passenger of the specified speed information acquired in step S4.

In step S6, the controller 20 determines whether or not the own vehicle 1 has reached a destination. When the own vehicle 1 has not reached the destination (step S6: N), the process returns to step S1. When the own vehicle 1 has reached the destination (step S6: Y), the process terminates.

Figure 6:
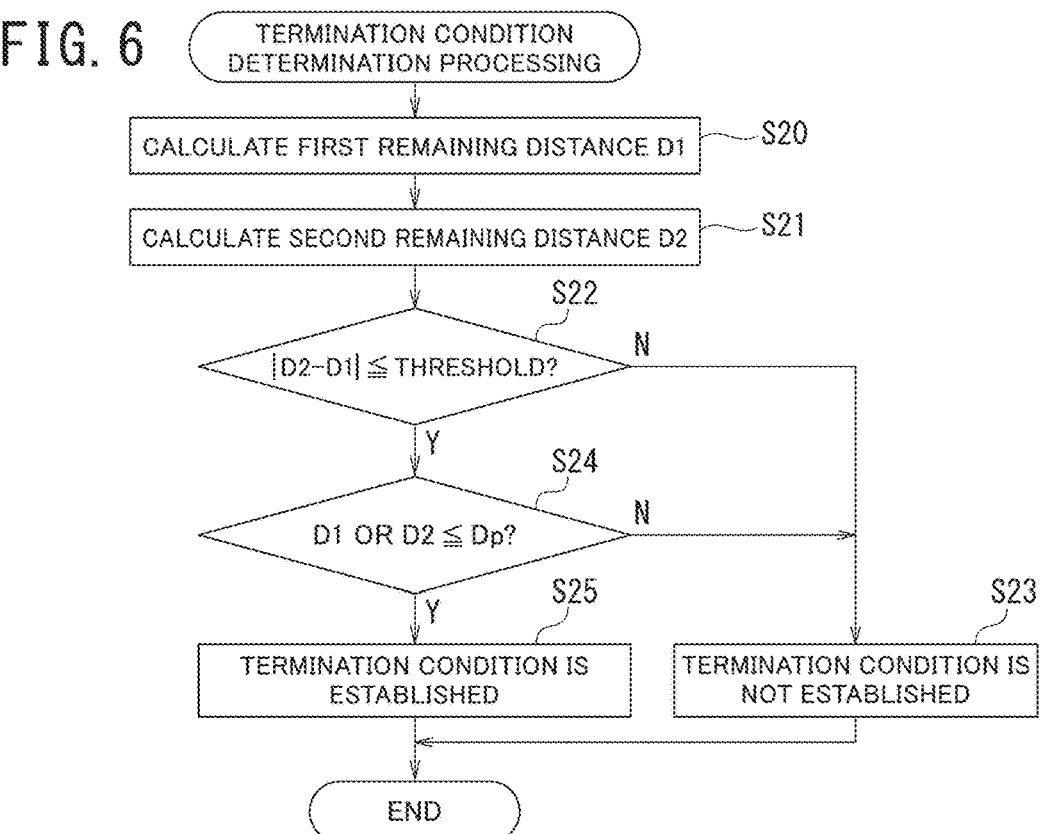
FIG. 6 is a flowchart of an example of termination condition determination processing.

On the other hand, in step S7, the controller 20 performs termination condition determination processing for determining whether or not a termination condition of the autonomous speed control is established. FIG. 6 is a flowchart of an example of the termination condition determination processing.

In step S20, the controller 20 calculates the first remaining distance D1. In step S21, the controller 20 calculates the second remaining distance D2.

In step S22, the controller 20 determines whether or not a difference |D2−D1| is less than or equal to a threshold. When the difference |D2−D1| is less than or equal to the threshold (step S22: Y), the process proceeds to step S24. When the difference |D2−D1| is not less than or equal to the threshold (step S22: N), the process proceeds to step S23.

In step S23, the controller 20 determines that the termination condition is not established. Subsequently, the termination condition determination processing terminates.

In step S24, the controller 20 determines whether or not the first remaining distance D1 is less than or equal to the predetermined distance Dp. The controller 20 may determine whether or not the second remaining distance D2 is less than or equal to the predetermined distance Dp. When the first remaining distance D1 is longer than the predetermined distance Dp or when the second remaining distance D2 is longer than the predetermined distance Dp (step S24: N), the process proceeds to step S23. When the first remaining distance D1 is less than or equal to the predetermined distance Dp or when the second remaining distance D2 is less than or equal to the predetermined distance Dp (step S24: Y), the process proceeds to step S25.

In step S25, the controller 20 determines that the termination condition is established. Subsequently, the termination condition determination processing terminates.

FIG. 5 is now referred to. When the termination condition is established (step S8: Y), the process proceeds to step S4. When the autonomous speed control has been started, the process proceeding to step S4 causes the autonomous speed control to terminate. When the termination condition is not established (step S8: N), the process proceeds to step S9.

In step S9, the controller 20 performs the autonomous speed control.

Figure 7:
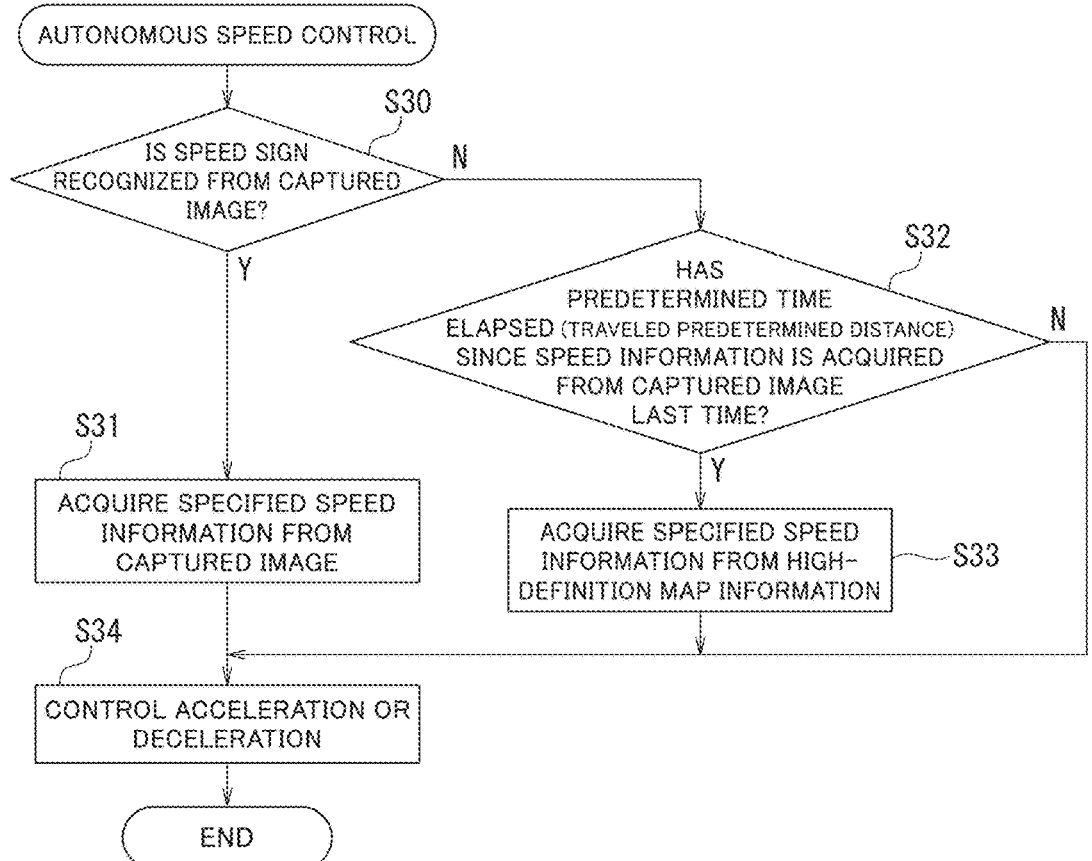
FIG. 7 is a flowchart of an example of autonomous speed control.

FIG. 7 is a flowchart of an example of the autonomous speed control.

In step S30, the controller 20 determines whether or not the controller 20 recognizes a speed sign from a captured image captured by the camera. When the controller 20 does not recognize a speed sign from the captured image (step S30: N), the process proceeds to step S32. When the controller 20 recognizes a speed sign from a captured image (step S30: Y), the process proceeds to step S31.

In step S31, the controller 20 acquires specified speed information of a lane in which the own vehicle 1 is traveling by recognizing the speed sign from the captured image. Subsequently, the process proceeds to step S34.

In step S32, the controller 20 determines whether or not a predetermined time has elapsed since the controller 20 acquired specified speed information from a captured image last time. Alternatively, the controller 20 may determine whether or not the own vehicle 1 has traveled predetermined distance since the controller 20 acquired specified speed information from a captured image last time. When the predetermined time has not elapsed (or when the own vehicle 1 has not traveled the predetermined distance yet)

(step S32: N), the process proceeds to step S34. In this case, the specified speed information acquired from a captured image last time continues to be used.

When the predetermined time has elapsed (or when the own vehicle 1 has traveled the predetermined distance), the process proceeds to step S33. In step S33, the controller 20 acquires specified speed information from the high-definition map information, based on the current position of the own vehicle 1. Subsequently, the process proceeds to step S34.

In step S34, the controller 20 controls acceleration or deceleration of the own vehicle 1, based on the specified speed information. Subsequently, the process proceeds to step S10 in FIG. 5.

FIG. 5 is now referred to. In step S10, the controller 20 notifies the passenger of the specified speed information acquired in the autonomous speed control in step S9. Subsequently, the process returns to step S7.

Advantageous Effects of Embodiment (1) The controller 20 executes processing including: acquiring a current position of the own vehicle 1; acquiring a captured image representing an environment in front of the own vehicle 1 from a camera; determining whether or not the current position of the own vehicle 1 is within the high-definition map-available region Rav in which high-definition map information is available; when determining that the current position of the own vehicle 1 is within the high-definition map-available region Ray, performing acceleration/deceleration control to control acceleration or deceleration of the own vehicle 1, based on specified speed information acquired by recognizing a speed sign in a captured image or specified speed information acquired from the high-definition map information based on the current position of the own vehicle 1 and also notifying a driver of the specified speed information; and when the own vehicle 1 is predicted to leave the high-definition map-available region Ray to the outside, terminating the acceleration/deceleration control based on the specified speed information and also acquiring specified speed information from road map information, the road map information having lower precision than the high-definition map information, based on the current position of the own vehicle 1 and notifying the driver of the acquired specified speed information at a point before a point at which the own vehicle 1 leaves the high-definition map-available region Ray to the outside.

Because of this configuration, it is possible to avoid the acceleration/deceleration control being performed based on inappropriate specified speed information in a region in which the high-definition map information is not available, such as the outside of the high-definition map-available region Rav. For example, it is possible to, when no specified speed information at the current position of the own vehicle can be acquired because a state in which no speed sign is recognized from a captured image captured by the camera continues in a region in which the high-definition map information is not available, avoid the acceleration/deceleration control being performed based on specified speed information.

(2) The controller 20 may, when distance to a point at which the own vehicle 1 leaves the high-definition map-available region Ray to the outside has decreased to the predetermined distance Dp, terminate the acceleration/deceleration control based on specified speed information and also notify the driver of the specified speed information acquired from the road map information.

Because of this configuration, it is possible to suppress behavior of the own vehicle 1 from becoming unstable immediately before termination of the acceleration/deceleration control caused by a speed sign of a lane different from a travel lane of the own vehicle 1 being falsely recognized by the camera immediately before the own vehicle 1 leaves the high-definition map-available region Ray to the outside.

(3) The predetermined distance Dp may be, for example, a distance at which a speed sign can be recognized from a captured image captured by the camera. Because of this configuration, it is possible to avoid acquiring specified speed information from a speed sign installed outside the high-definition map-available region Rav.

(4) The controller 20 may terminate notification of specified speed information acquired from the road map information and start the acceleration/deceleration control based on specified speed information acquired from the high-definition map information or a captured image at a point in time at which the current position of the own vehicle 1 changes from the outside to the inside of the high-definition map-available region Rav.

Because of this configuration, it is possible to acquire accurate specified speed information and make use of the acquired specified speed information in the acceleration/deceleration control in an early stage when the high-definition map information becomes available.

(5) The controller 20 may, when no specified speed information can be acquired from a captured image while the current position of the own vehicle 1 is within the high-definition map-available region Ray, continue performing the acceleration/deceleration control based on specified speed information acquired from a captured image immediately before specified speed information became unable to be acquired during a predetermined time or while the own vehicle 1 travels a predetermined distance after specified speed information became unable to be acquired.

When the controller 20 continues using specified speed information acquired immediately before specified speed information became unable to be acquired until a predetermined time elapses or the own vehicle 1 travels a predetermined distance, acquiring incorrect specified speed information from a captured image causes the acceleration/deceleration control to continue to be performed based on the incorrect specified speed information until the predetermined time elapses or the own vehicle 1 travels the predetermined distance.

Terminating the acceleration/deceleration control based on specified speed information at a point Pc before a point at which the own vehicle 1 leaves the high-definition map-available region Ray to the outside enables continuing the acceleration/deceleration control based on specified speed information acquired by recognizing, by the camera, a speed sign of a lane different from a travel lane of the own vehicle 1 immediately before the own vehicle 1 leaves the high-definition map-available region Ray to the outside to be avoided.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

Own vehicle
10 Driving assistance device
11 Sensor
12 Positioning device
13H High-definition map DB
13N Navigation map DB
14 In-vehicle device
15 Navigation system
16 Display device
17 Sound output device
18 Input device
19 Vehicle behavior control device
20 Controller
21 Processor
22 Storage device

The invention claimed is:

1. A vehicle control method causing a controller to execute processing comprising:
   acquiring a current position of an own vehicle;
   acquiring a captured image representing an environment in front of the own vehicle from a camera;
   determining whether or not a current position of the own vehicle is within a high-definition map-available region in which high-definition map information is available;
   when determining that a current position of the own vehicle is within the high-definition map-available region, performing acceleration/deceleration control to control acceleration or deceleration of the own vehicle, based on specified speed information acquired by recognizing a speed sign in the captured image or specified speed information acquired from the high-definition map information based on a current position of the own vehicle and also notifying a driver of the specified speed information; and
   when the own vehicle is predicted to leave the high-definition map-available region to an outside, terminating the acceleration/deceleration control based on the specified speed information at a point before a point at which the own vehicle leaves the high-definition map-available region to an outside and also switching the specified speed information to specified speed information acquired from road map information, the road map information having lower precision than the high-definition map information, based on a current position of the own vehicle and notifying the driver of the acquired specified speed information at a point before a point at which the own vehicle leaves the high-definition map-available region to an outside.

2. The vehicle control method according to claim 1, wherein the controller, when distance to a point at which the own vehicle leaves the high-definition map-available region to an outside has decreased to a predetermined distance, terminates the acceleration/deceleration control based on the specified speed information and also notifies a driver of the specified speed information acquired from the road map information.

3. The vehicle control method according to claim 2, wherein the predetermined distance is a distance at which a speed sign can be recognized from a captured image captured by the camera.

4. The vehicle control method according to claim 1, wherein at a point in time at which a current position of the own vehicle changes from an outside to an inside of the high-definition map-available region, the controller terminates notification of the specified speed information acquired from the road map information and starts the acceleration/deceleration control based on the specified speed information acquired from the high-definition map information or the captured image.

5. The vehicle control method according to claim 1, wherein when the specified speed information cannot be acquired from the captured image while a current position of the own vehicle is within the high-definition map-available region, the vehicle control method continues performing the acceleration/deceleration control based on the specified speed information acquired from the captured image immediately before the specified speed information became unable to be acquired during a predetermined time or while the own vehicle travels a predetermined distance after the specified speed information became unable to be acquired.

6. A vehicle control device comprising:
   a camera configured to capture an environment in front of an own vehicle; and
   a controller configured to execute processing including:
      acquiring a current position of the own vehicle;
      acquiring a captured image representing an environment in front of the own vehicle from the camera;
      determining whether or not a current position of the own vehicle is within a high-definition map-available region in which high-definition map information is available;
      when determining that a current position of the own vehicle is within the high-definition map-available region, performing acceleration/deceleration control to control acceleration or deceleration of the own vehicle, based on specified speed information acquired by recognizing a speed sign in the captured image or specified speed information acquired from the high-definition map information based on a current position of the own vehicle and also notifying a driver of the specified speed information; and
      when the own vehicle is predicted to leave the high-definition map-available region to an outside, terminating the acceleration/deceleration control based on the specified speed information at a point before a point at which the own vehicle leaves the high-definition map-available region to an outside and also switching the specified speed information to specified speed information acquired from road map information, the road map information having lower precision than the high-definition map information, based on a current position of the own vehicle and notifying the driver of the acquired specified speed information at a point before a point at which the own vehicle leaves the high-definition map-available region to an outside.

* * * * *